United States Patent [19]

Shue et al.

[11] 4,292,416

[45] Sep. 29, 1981

[54] POLYMER BLENDS

[75] Inventors: Robert S. Shue; Lacey E. Scoggins, both of Bartlesville, Okla.

[73] Assignee: Phillips Petroleum Co., Bartlesville, Okla.

[21] Appl. No.: 122,980

[22] Filed: Feb. 21, 1980

[51] Int. Cl.$^3$ .................... C08L 81/04; C08L 77/00
[52] U.S. Cl. .................... 525/420; 525/537
[58] Field of Search .................... 525/420, 537

[56] References Cited

U.S. PATENT DOCUMENTS

| | | | |
|---|---|---|---|
| 3,287,288 | 11/1966 | Relling | 260/4 |
| 3,294,871 | 12/1966 | Schmitt et al. | 260/900 |
| 3,379,792 | 4/1968 | Finholt | 260/857 |
| 3,620,892 | 11/1971 | Wincklhofer | 161/89 |
| 3,879,301 | 4/1975 | Cairns | 252/12 |
| 4,017,555 | 4/1977 | Alvarez | 525/537 |
| 4,021,596 | 5/1977 | Bailey | 525/537 |

FOREIGN PATENT DOCUMENTS

| | | | |
|---|---|---|---|
| 55-45704 | 3/1980 | Japan | 525/537 |
| 80/00349 | 3/1980 | PCT Int'l Appl. | 525/420 |

*Primary Examiner*—Paul Lieberman

[57] ABSTRACT

A polymer blend comprising a polyamide and a small effective amount of a poly(arylene sulfide) resin. The addition of the poly(arylene sulfide) resin improves the properties of the polyamide and, especially, the molding characteristics of polyamides.

12 Claims, No Drawings

POLYMER BLENDS

This invention relates to polymer blends. In accordance with another aspect, this invention relates to polymer blends of a polyamide and a poly(arylene sulfide) resin. In accordance with a further aspect, this invention relates to polyamides exhibiting improved properties having incorporated therein a small, minor effective amount of a poly(arylene sulfide) resin. In accordance with a further aspect, this invention relates to polyamides exhibiting improved molding characteristics having incorporated therein a small, minor amount of a poly(arylene sulfide) resin.

Accordingly, an object of this invention is to provide polyamide compositions having improved properties.

Another object of this invention is to provide polyamide compositions having improved molding characteristics.

In accordance with a further object of the invention, the mechanical properties of molded articles from polyamides exhibit improved characteristics.

Other objects, aspects, as well as the several advantages of the invention will be apparent to those skilled in the art upon reading the specification and the appended claims.

In accordance with the invention, the properties of polyamide-based compositions are improved by the addition of a small, but effective amount of a poly(arylene sulfide) resin. The inventive compositions exhibit improved properties compared to the polyamide compositions without poly(arylene sulfide).

While we do not wish to be bound by theory, it now appears to us that the improved properties of the inventive compositions are a result of the poly(arylene sulfide) acting as a nucleating agent in the polyamide. The need for and use of nucleating agents in polyamides is well known in the art. Examples of prior art references to such nucleating agents are U.S. Pat. Nos. 3,261,800; 3,400,087; 3,080,345; and 3,555,805.

The polyamides with which this invention is concerned are semi-crystalline polymers. Such polyamides appear to possess crystalline and amorphous regions. Nucleating agents present in such materials are believed to provide sites for crystal growth, thus enhancing the crystallinity of the polymer. Many properties of the resultant polymer, such as strength and molding characteristics, are dependent upon the degree of crystallinity in the polymer. Thus, polyamides which do not normally contain sufficient crystallinity to maintain desirable properties can frequently be improved in those properties by addition of a nucleating agent.

Suitable nucleating agents known in the prior art include finely divided organic or inorganic salts, silica, alumina, boron nitride, etc. It is also known in the art to employ as nucleating agents compounds or polymers which exhibit a higher melting point than that of the base polyamide, such that polyamide and nucleating agent are molten under processing conditions and, as cooling occurs, the nucleating agent precipitates first in a finely divided state to provide sites for nucleation when the polyamide begins to precipitate.

Polyamides which are suitable for use in the present invention include those conventional and well-known nylon and polyamide resins having recurring amide groups as integral parts of a molecular chain structure characterized by amide links and hydrocarbon links along the chain. Typical of these polyamides is the product commercially known as nylon 6 which is obtained by the polymerization of caprolactam. Another typical polyamide is that obtained by the condensation of a dibasic acid (e.g., adipic acid, sebacic acid, terephthalic acid) and a diamine (e.g., hexamethylene diamine, 1,12-dodecanediamine).

Especially suitable in the present invention are those polyamides prepared from terephthalic acid and branched aliphatic diamines containing ten carbon atoms. Such polyamides are generally described in U.S. Pat. No. 3,980,621 which is incorporated herein by reference. They are linear terephthalamide polymers composed at least primarily of recurring structural units of the formula

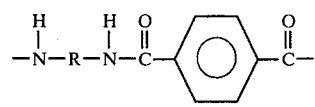

wherein R is selected from the group consisting essentially of 5-methylnonamethylene, 2,4-dimethyloctamethylene, and 2,4,6-trimethylheptamethylene, with at least 50 percent, more preferably at least 70 percent, and most preferably at least 80 percent of the R's being 5-methylnonamethylene. While polymers containing the above-described mixtures of R groups are most frequently employed in this invention, it is also within the scope of this invention to employ polymers in which the R is exclusively 5-methylnonamethylene.

It is likewise within the scope of this invention to employ admixtures of any of the above-described polyamides or copolymers prepared from mixtures of any of the above-described polyamide precursors.

The polyamides useful in this invention can be prepared by a wide variety of well-known procedures, such as, condensation polymerization of previously prepared or in situ prepared-salts under suitable condensation-inducing conditions.

Suitable arylene sulfide polymers for use in the present invention in combination with the above-described polyamides include those which are well known in the art to be prepared from polyhalo-substituted aromatic compounds and suitable sulfur sources. Examples of prior art references containing descriptions of and preparation of suitable arylene sulfide polymers that can be used according to the invention are U.S. Pat. Nos. 3,354,129; 4,064,114; 4,096,132; and 4,116,947. These references are incorporated herein by reference. Especially suitable phenylene sulfide polymers are prepared from 1,4-dichlorobenzene and a suitable sulfur source, such as sodium sulfide, sodium hydrosulfide, or hydrogen sulfide, in the presence of a polar organic compound such as an N-alkyllactam. Thus, the especially suitable arylene sulfide polymer has recurring units predominantly consisting of

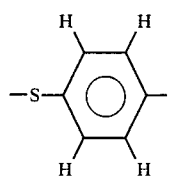

The above-described arylene sulfide polymers can be employed in any suitable form, such as, finely divided powder, solution in suitable diluent, or as solid polymer in pieces of any desired size, such as chopped extrudate. It is especially desirable to employ finely divided powder which can be readily dispersed in the polyamide by simply hot mixing above the melting point of the polyamide. If solution of arylene sulfide polymer in a suitable diluent is employed, it will be necessary to remove the diluent, e.g., by evaporation or washing, prior to processing the composition into its final form. If pieces of arylene sulfide polymer larger than finely divided powder are employed in the present invention, it will be necessary to heat the inventive composition to a temperature exceeding the melting point of the polyamide and the arylene sulfide polymer in order for thorough dispersion of the arylene sulfide polymer to occur.

It will be recognized by one skilled in the art that arylene sulfide polymers must be selected which possess melting points higher than that of the desired polyamide. It is generally desirable to employ arylene sulfide polymers with melting points at least 25° C. higher than the melting point of the polyamide.

The compositions of the present invention will generally contain arylene sulfide polymers in amounts ranging from about 0.01 to about 10 weight percent (based on total composition) with an especially preferred range of arylene sulfide polymers being from about 0.1 to about 1 weight percent.

Following the addition of arylene sulfide polymer to polyamide and thorough dispersion as above-described, any desired well-known process can be employed to obtain the composition in its final desired form, such as injection molding, compression molding, spinning, etc. The composition can be shaped into any desired form such as fiber, film, sheets, tubes, rods, household articles and various hardware fixtures.

One skilled in the art will readily recognize that following dispersion of the arylene sulfide polymer and the polyamide, it will be necessary to elevate the temperature of the composition to a point above the melting point of the polyamide and maintain the composition above that temperature until the composition reaches a fluid state characterized by the melting of the polyamide, and then applying whatever processing means is desirable, such as molding, spinning, etc., to achieve the final desired condition of the composition.

It is within the scope of this invention to include in the inventive composition conventional additives normally employed in polyamides, such as lubricants, stabilizers, pigments, dyes, fillers, plasticizers and the like.

EXAMPLE

The following inventive and comparative runs were conducted to demonstrate the present invention and to provide comparision between properties of inventive compositions and prior art compositions.

The polyamide employed in the following runs was prepared from terephthalic acid and a diamine mixture comprising 5-methyl-1,9-nonanediamine (89 weight percent), 2,4-dimethyl-1,8-octanediamine (10 weight percent) and 2,4,6-trimethyl-1,7-heptanediamine (about 0.05 weight percent). Terephthalic acid (1827 g, 11.00 mole), diamine mixture (1990 g, 11.55 mole), water (954 g), titanium dioxide (9.98 g) and manganese lactate (0.1746 g) were mixed in an oil-jacketed, steel, stirred reactor under a nitrogen atmosphere. The stirring reactor was sealed and the oil temperature was increased over one hour to 210° C. at which level the oil temperature was maintained for an additional 2.5 hr. (reaction mixture reached 193° C. and 2000 kPa). The oil temperature was further increased to 290° C. over 0.5 hour and held at that temperature for an additional 0.5 hour (reaction mixture reached 249° C. and 2800 kPa with venting, if necessary). The reactor was slowly vented to atmospheric pressure over 0.5 hour (reaction mixture reached 266° C.) and held for an additional 0.5 hour under a nitrogen purge. The reaction mixture was heated to 280° C. under reduced pressure for 0.75 hour. The molten polymer was extruded from the reactor into a water quench bath.

The p-phenylene sulfide polymer (PPS) employed in the inventive runs as a finely divided powder was a commercial grade (Ryton TM V-1 from Phillips Petroleum Company).

In the following comparative runs the above-described polyamide was injection molded (285° C. barrel temperature) into molds at the temperatures specified in the table and held in the molds for the holding times specified in the table prior to removal from the molds.

In the following inventive runs p-phenylene sulfide polymer powder (0.5 weight percent based on total composition) was physically admixed with polyamide pellets and intimately mixed in the extruder of the injection molding machine (285° C. barrel temperature). Mold temperatures and mold holding times are given in the table.

TABLE

| Run No. | PPS[a] | Mold,[b] °C. | Hold,[c] min. | Surface Crystallinity,[d] | Tensile,[e] mPa | Elong.[e] | Flex Mod[f] mPa | Izod Impact,[g] J/m notch | Heat Deflection °C. | Hardness,[i] Shore D | Warpage[j] |
|---|---|---|---|---|---|---|---|---|---|---|---|
| 1(Comp.) | No | 170 | 1 | —[k] | 78.1 | 11 | 2.49 | 38.5 | — | 85 | significant |
| 2 (Inv.) | Yes | 170 | 1 | 16.9 | 75.2 | 47 | 2.44 | 70.7 | 104 | 85 | none |
| 3 (Comp.) | No | 170 | 3 | — | 61.6 | 7 | 2.48 | 55.7 | — | 85 | significant |
| 4 (Inv.) | Yes | 170 | 3 | 16.1 | 75.5 | 44 | 2.43 | 54.6 | 107 | 85 | very slight |
| 5 (Comp.) | No | 170 | 7.5 | 17.8 | 80.8 | 6 | 2.50 | 16.6 | 97 | 85 | significant |
| 6 (Inv.) | Yes | 170 | 7.5 | 18.8 | 75.4 | 42 | 2.46 | 62.1 | 107 | 86 | very slight |
| 7 (Comp.) | No | 100 | 1 | 3.6 | 65.7 | 107 | 2.14 | 25.7 | 86 | 84 | none |

TABLE-continued

| Run No. | PPS[a] | Mold,[b] °C. | Hold,[c] min. | Surface Crystallinity,[d] | Tensile,[e] mPa | Elong.[e] | Flex Mod.[f] mPa | Izod Impact,[g] J/m notch | Heat Deflection °C. | Hardness,[i] Shore D | Warpage[j] |
|---|---|---|---|---|---|---|---|---|---|---|---|
| 8(Inv.) | Yes | 100 | 1 | 6.2 | 64.9 | 90 | 2.18 | 185.8 | 88 | 84 | none |

[a] p-Phenylene sulfide polymer, 0.5 weight percent.
[b] Mold temperature.
[c] Holding time of object in mold before release.
[d] Percent crystallinity as measured by X-ray diffraction.
[e] ASTM D 638
[f] ASTM D 790
[g] ASTM D 256
[h] ASTM D 648
[i] ASTM D 2240
[j] Warpage of molded object upon removal from mold.
[k] Dash denotes not measured.

The data in the above table show that the impact strength and warpage of molded compositions in inventive runs 2, 4 and 6 are significantly better than their comparative counterparts (impact strengths in runs 3 and 4 appear anomalous—reason unknown). Runs 7 (comparative) and 8 (inventive) which were made at lower mold temperatures exhibited lower surface crystallinity, tensile strength, flexural modulus, and heat deflection than runs 1 to 6, and neither showed significant warpage but inventive run 8 demonstrated significantly higher impact strength than comparative run 7. Thus, the four inventive runs demonstrated superior impact strength and/or warpage resistance compared to compositions without added p-phenylene sulfide polymer.

We claim:

1. A polymeric blend exhibiting improved properties comprising:
   (a) a major amount of a polyamide selected from the group consisting of polyamide resins obtained by
     (1) the polymerization of caprolactam, and
     (2) the condensation of a dibasic acid and a diamine, and
   (b) a small but effective minor amount ranging from about 0.01 to about 10 weight percent of the total composition, sufficient to improve impact strength and/or warpage resistance of the blend, of a poly(arylene sulfide) resin.

2. A composition according to claim 1 wherein the amount of (b) present ranges from about 0.1 to about 1 weight percent of the total composition and wherein (a) is a linear terephthalamide polymer composed of recurring structural units of the formula $$-\overset{H}{\underset{|}{N}}-R-\overset{H}{\underset{|}{N}}-\overset{O}{\underset{\|}{C}}-\!\!\left\langle\!\!\bigcirc\!\!\right\rangle\!\!-\overset{O}{\underset{\|}{C}}-$$

wherein R is selected from the group consisting essentially of 5-methylnonamethylene, 2,4-dimethyloctamethylene, and 2,4,6-trimethylheptamethylene, with at least 50 percent of the R's being 5-methylmonamethylene.

3. A molded article formed from the composition of claim 1.

4. A composition according to claim 1 wherein said poly(arylene sulfide) resin possesses a melting point higher than that of the polyamide.

5. A composition according to claim 1 wherein (b) is poly(phenylene sulfide) and the amount of (b) present ranges from about 0.1 to about 1 weight percent.

6. A composition according to claim 1 wherein (a) is prepared from terephthalic acid and a methylnonanediamine isomer mixture.

7. A composition according to claim 1 wherein (a) is prepared from terephthalic acid and a methylnonanediamine isomer mixture and (b) is poly(phenylene sulfide) and the amount of (b) present ranges from about 0.1 to about 1 weight percent.

8. A method for improving properties of polyamides selected from the group consisting of polyamide resins obtained by
   (1) the polymerization of caprolactam,
   (2) the condensation of a dibasic acid and a diamine, and
which comprises incorporating therein a small but effective minor amount ranging from about 0.01 to about 10 weight percent of the total composition of a poly(arylene sulfide) resin which amount is sufficient to improve impact strength and/or warpage resistance of the resulting blend compared to polyamide compositions without poly(arylene sulfide).

9. A method according to claim 8 wherein the amount of (b) present ranges from about 0.1 to about 1 weight percent of the total composition and (b) has a higher melting point than (a) and wherein (a) is a linear terephthalamide polymer composed of recurring structural units of the formula $$-\overset{H}{\underset{|}{N}}-R-\overset{H}{\underset{|}{N}}-\overset{O}{\underset{\|}{C}}-\!\!\left\langle\!\!\bigcirc\!\!\right\rangle\!\!-\overset{O}{\underset{\|}{C}}-$$

wherein R is selected from the group consisting essentially of 5-methylnonamethylene, 2,4-dimethyloctamethylene, and 2,4,6-trimethylheptamethylene, with at least 50 percent of the R's being 5-methylnonamethylene.

10. A method according to claim 8 wherein (b) is added as particulate material and the resulting blend is subjected to hot mixing above the melting point of (a).

11. A method according to claim 8 wherein a molded article is formed from the blend of polyamide and poly(arylene sulfide) resin exhibiting superior impact strength and/or warpage resistance compared to articles formed without added poly(arylene sulfide) resin.

12. A method according to claim 8 wherein said polyamide is formed from terephthalic acid and a methylnonanediamine isomer mixture and said poly(arylene sulfide) resin is poly(phenylene sulfide) and the amount incorporated into said polyamide ranges from about 0.1 to about 1 weight percent.

* * * * *